US006801855B1

(12) United States Patent
Walters et al.

(10) Patent No.: US 6,801,855 B1
(45) Date of Patent: Oct. 5, 2004

(54) SYSTEMS AND METHODS WITH INTEGRATED GPS AND DEAD RECKONING CAPABILITIES

(75) Inventors: Thomas H. Walters, Gardner, KS (US); Cliff A. Pemble, Olathe, KS (US); Min H. Kao, Leawood, KS (US)

(73) Assignee: Garmin Ltd. (KY)

( * ) Notice: Subject to any disclaimer, the term of this patent is extended or adjusted under 35 U.S.C. 154(b) by 78 days.

(21) Appl. No.: 10/184,373

(22) Filed: Jun. 28, 2002

(51) Int. Cl.$^7$ .......................... H04B 7/185; G01S 5/02; G01C 17/38
(52) U.S. Cl. ...................... 701/216; 701/211; 340/995.1
(58) Field of Search ................ 701/216, 217, 701/200, 211, 213; 73/718 R; 340/995.1, 995.14, 995.19, 995.28

(56) References Cited

U.S. PATENT DOCUMENTS

| | | |
|---|---|---|
| 4,811,613 A | 3/1989 | Phillips et al. ............. 74/5.6 D |
| 4,831,563 A | 5/1989 | Ando et al. ............ 364/571.05 |
| 4,924,402 A | 5/1990 | Ando et al. .................. 364/449 |
| 5,208,756 A | 5/1993 | Song .......................... 364/449 |
| 5,220,509 A | 6/1993 | Takemura et al. .......... 364/449 |
| 5,331,563 A | 7/1994 | Masumoto et al. ......... 342/457 |
| 5,349,530 A | 9/1994 | Odagawa .................... 364/449 |
| 5,363,306 A | 11/1994 | Kuwahara et al. .......... 364/449 |
| 5,396,430 A | 3/1995 | Arakawa et al. ........... 364/449 |
| 5,416,712 A | 5/1995 | Geier et al. ................. 364/450 |
| 5,424,953 A | 6/1995 | Masumoto et al. ......... 364/449 |
| 5,506,774 A | 4/1996 | Nobe et al. .............. 364/424.05 |
| 5,528,248 A | 6/1996 | Steiner et al. .............. 342/357 |
| 5,657,231 A | 8/1997 | Nobe et al. ............... 364/449.3 |
| 5,689,809 A | 11/1997 | Grube et al. ............... 455/54.1 |
| 5,742,925 A | 4/1998 | Baba .......................... 701/221 |
| 5,786,789 A | 7/1998 | Janky ......................... 342/357 |
| 5,848,373 A | 12/1998 | DeLorme et al. ........... 701/200 |
| 5,852,791 A | 12/1998 | Sato et al. .................. 701/217 |
| 5,862,511 A | 1/1999 | Croyle et al. ............... 701/213 |
| 5,890,092 A | 3/1999 | Kato et al. .................. 701/216 |
| 5,938,721 A | 8/1999 | Dussell et al. .............. 701/211 |
| 6,067,046 A | 5/2000 | Nichols .................. 342/357.14 |
| 6,125,325 A * | 9/2000 | Kohli .......................... 701/213 |
| 6,182,006 B1 | 1/2001 | Meek .......................... 701/200 |
| 6,266,612 B1 | 7/2001 | Dussell et al. .............. 701/207 |
| 6,321,158 B1 * | 11/2001 | DeLorme et al. ........... 701/201 |
| 6,353,798 B1 | 3/2002 | Green et al. ................ 701/213 |
| 6,373,430 B1 | 4/2002 | Beason et al. ......... 342/357.09 |
| 6,374,177 B1 | 4/2002 | Lee et al. .................... 701/200 |
| 6,374,179 B1 | 4/2002 | Smith et al. ................ 701/207 |
| 6,400,753 B1 * | 6/2002 | Kohli et al. ................. 375/134 |
| 6,411,899 B2 | 6/2002 | Dussell et al. .............. 701/211 |
| 6,415,223 B1 * | 7/2002 | Lin et al. .................... 701/208 |
| 6,421,609 B2 * | 7/2002 | Kohli .......................... 701/213 |
| 6,429,812 B1 | 8/2002 | Hoffberg ................. 342/357.1 |
| 6,452,544 B1 * | 9/2002 | Hakala et al. ......... 342/357.13 |
| 6,492,941 B1 | 12/2002 | Beason et al. ........... 342/357.1 |
| 6,529,824 B1 | 3/2003 | Obradovich et al. ........ 701/208 |
| 6,529,829 B2 * | 3/2003 | Turetzky et al. ............ 701/213 |
| 6,553,308 B1 * | 4/2003 | Uhlmann et al. ........... 701/208 |
| 6,574,558 B2 * | 6/2003 | Kohli .......................... 701/213 |
| 6,594,617 B2 * | 7/2003 | Scherzinger ................ 702/160 |
| 6,601,012 B1 * | 7/2003 | Horvitz et al. .............. 702/150 |
| 2002/0169551 A1 | 11/2002 | Inoue et al. ................. 701/213 |

* cited by examiner

Primary Examiner—William A. Cuchlinski, Jr.
Assistant Examiner—Olga Hernandez
(74) Attorney, Agent, or Firm—Devon A. Rolf

(57) ABSTRACT

Systems and methods are provided for complementary navigation devices with various integrated positioning functionality. The navigation method includes providing a first navigation device. The first navigation device includes a triangulation positioning functionality. The method includes providing a second navigation device adapted to communicate with the first navigation device. The second navigation device includes one or more dead reckoning positioning components. The method further includes resolving a position of the first and the second navigation devices. Resolving the position includes using the one or more dead reckoning positioning components in complement to the triangulation positioning functionality to determine the position when the triangulation positioning functionality is degraded.

36 Claims, 9 Drawing Sheets

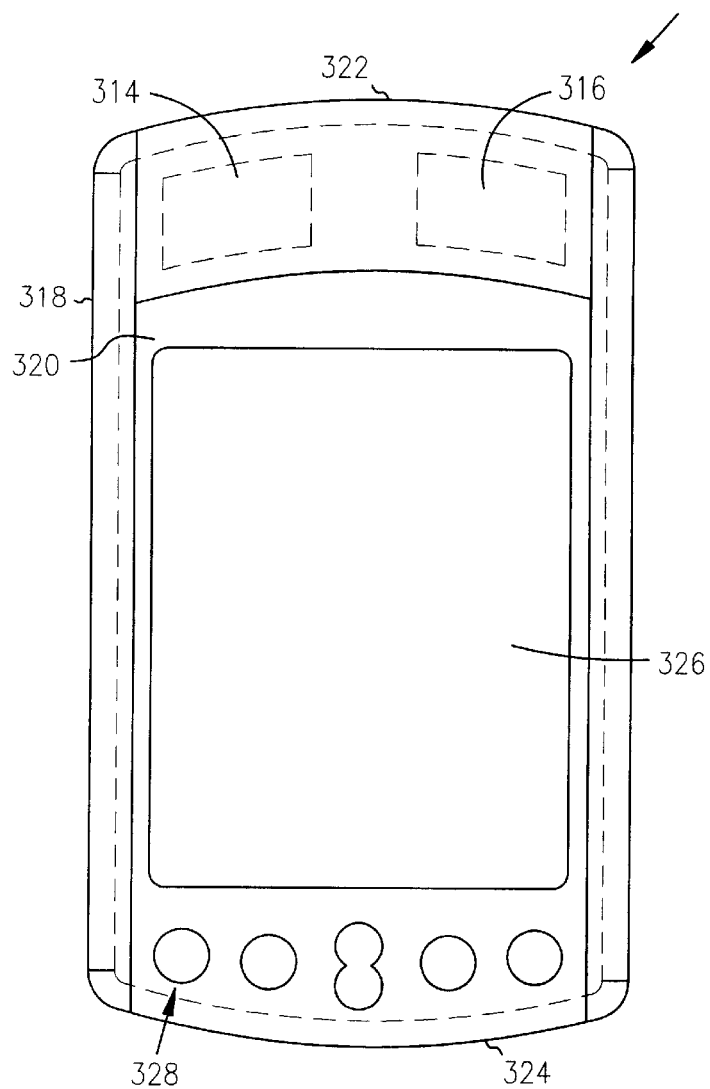
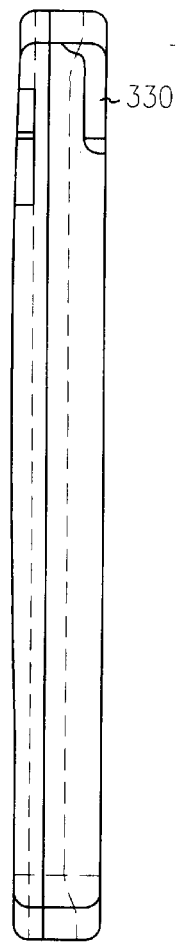
FIG. 3A  FIG. 3B
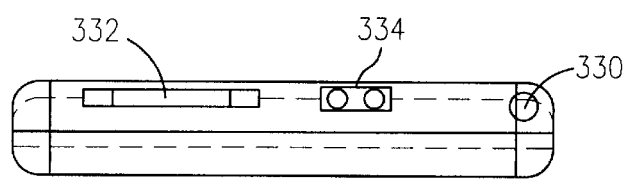
FIG. 3C

SYSTEMS AND METHODS WITH INTEGRATED GPS AND DEAD RECKONING CAPABILITIES

CROSS REFERENCE TO RELATED APPLICATIONS

This application is related to the following co-pending, commonly assigned U.S. patent application: "Portable Navigation Device with Integrated GPS and Dead Reckoning Functionality," Ser. No. 10/184,844, "Rugged, Waterproof, Navigation Device with Touch Panel," Ser. No. 10/186,155, and "Rugged, Waterproof, Navigation Device with Touch Panel," Ser. No. 10/185,604, which are filed on even date herewith and which disclosures are herein incorporated by reference.

FIELD OF THE INVENTION

The present invention relates generally to navigation devices and, more particularly, to systems and methods with integrated Global Positioning System (GPS) and dead reckoning capabilities.

BACKGROUND OF THE INVENTION

Electronic navigation devices employing Global Positioning System ("GPS") receivers are known. The GPS includes a plurality of satellites that are in orbit about the Earth. The orbit of each satellite is not necessarily synchronous with the orbits of other satellites and, in fact, is likely asynchronous. The GPS receiver device receives spread spectrum GPS satellite signals from the various satellites. The spread spectrum signals continuously transmitted from each satellite utilize a highly accurate frequency standard accomplished with an extremely accurate atomic clock. Each satellite, as part of its data signal transmission, transmits a data stream indicative of that particular satellite. The GPS receiver device acquires spread spectrum GPS satellite signals from at least three satellites to calculate its two-dimensional position by triangulation. Acquisition of an additional signal, resulting in signals from a total of four satellites, permits the GPS receiver device to calculate its three-dimensional position. In this manner, an electronic navigation device employing a GPS receiver has the ability to accurately compute the position of the device in real time, even as the device moves.

Although GPS enabled devices are often used to describe navigation devices, it will be readily appreciated that satellites need not be used at all to determine a geographic position of a receiving unit, since cellular towers or any customized transmitting radio frequency towers can be deployed and combined in groups of three or more. With such a configuration, any standard geometric triangulation algorithm can be used to determine an approximate location of the receiving unit.

Today some high end luxury automobiles include built in navigation devices. Generally, such vehicles include processor and memory capabilities housed within the dashboard or elsewhere in the vehicle. Such processor and memory capability can be extensive since the cost of high end vehicles covers the added equipment. Manufactures of such equipment include OnStar (a division of GM), Alpine, Philips, Pioneer, Visteon, and Delphi. However, such vehicles are often out of the price range for the average consumer. A similar situation applies to marine craft.

Many handheld electronic navigation devices are presently on the market. One example of an electronic navigation device is the eMAP and another is the StreetPilot III, both of which are portable electronic map and navigation devices manufactured by Garmin International. Some consumers readily carry such handheld electronic navigation devices with them when they are traveling in their vehicles in order to enjoy the benefit of navigational aids while driving. The StreetPilot III, for example, is designed to plug into the 12 Volt outlet in an automobile and be used as a navigational aid while driving.

In recent years, attempts have been made to combine navigation and geographic positioning services on other types of multipurpose devices, e.g. PDAs, cell phones and other intelligent appliances/apparel of the like. PDAs, for example, are small, substantially hand-held computers that are used for storing, manipulating and retrieving data. One example of a PDA is the Palm Pilot® manufactured by 3Com Corporation.

Plug-in GPS receiver modules for PDAs are known. There are problems associated with various plug-in GPS receiver modules and PDAs. One problem is that a PDA with a plug-in GPS receiver module is cumbersome to handle and use. Two separate devices must be handled. Additionally, the plug-in GPS receiver module and the PDA do not function together to provide integrated PDA features.

Further, among portable electronic navigation devices, including PDAs with plug-in receiver modules, there does not exist a back-up mechanism for continuing navigation related services when positioning signal reception is lost. This is particular problematic when such devices are used in "urban-canyons" such as street level in a city beneath towering sky scrapers which "shade" or block satellite reception. Additionally, there are numerous other reasons which may cause a navigation device using a triangulation positioning technology to lose reception of positioning signals.

Therefore, there exists a need for a navigation system which integrates complementary positioning functions, e.g. that incorporate a triangulation positioning functionality with a dead reckoning positioning functionality such that the system can continue to provide navigation related services in "urban-canyons" or otherwise when a primary positioning service is degraded or otherwise interrupted. Further, it is desirable that such a system be adapted to incorporate existing portable electronic map and navigation device services with existing vehicle positioning equipment in a manner which affords more complete and reliable navigation services to a wider range of consumers.

SUMMARY OF THE INVENTION

The above mentioned problems of navigational systems are addressed by the present invention and will be understood by reading and studying the following specification. Systems and methods are provided for complementary, mobile navigation devices which incorporate triangulation positioning functionality and one or more dead reckoning positioning components, e.g. to provide complete and reliable navigation related services in "urban-canyons" or otherwise when a primary positioning service is interrupted.

In one embodiment of the present invention, a navigation method is provided. The navigation method includes providing a first navigation device. The first navigation device includes a triangulation positioning functionality. The method includes providing a second navigation device adapted to communicate with the first navigation device. The second navigation device includes one or more dead reckoning positioning components. The method further includes resolving a position of the first and the second navigation devices. Resolving the position includes using the one or more dead reckoning positioning components in complement to the triangulation positioning functionality to determine the position when the triangulation positioning functionality is degraded.

These and other aspects, embodiments, advantages, and features of the present invention will be set forth in part in the description which follows, and in part will become apparent to those skilled in the art by reference to the following description of the invention and referenced drawings or by practice of the invention.

The aspects, advantages, and features of the invention are realized and attained by means of the instrumentalities, procedures, and combinations particularly pointed out in the appended claims.

BRIEF DESCRIPTION OF THE DRAWINGS

FIGS. 3A–3C illustrate views for another embodiment of an electronic navigational device according to the teachings of the present invention;

DETAILED DESCRIPTION OF THE INVENTION

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to, among other things, systems and methods for complementary, mobile navigation devices which incorporate triangulation positioning functionality and one or more dead reckoning positioning components, e.g. to provide complete and reliable navigation related services in "urban-canyons" or otherwise when a primary positioning service is interrupted. One type of navigational system includes Global Positioning Systems (GPS). Such systems are known and have a variety of uses. In general, GPS is a satellite-based radio navigation system capable of determining continuous position, velocity, time, and in some instances direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

Figure 1:
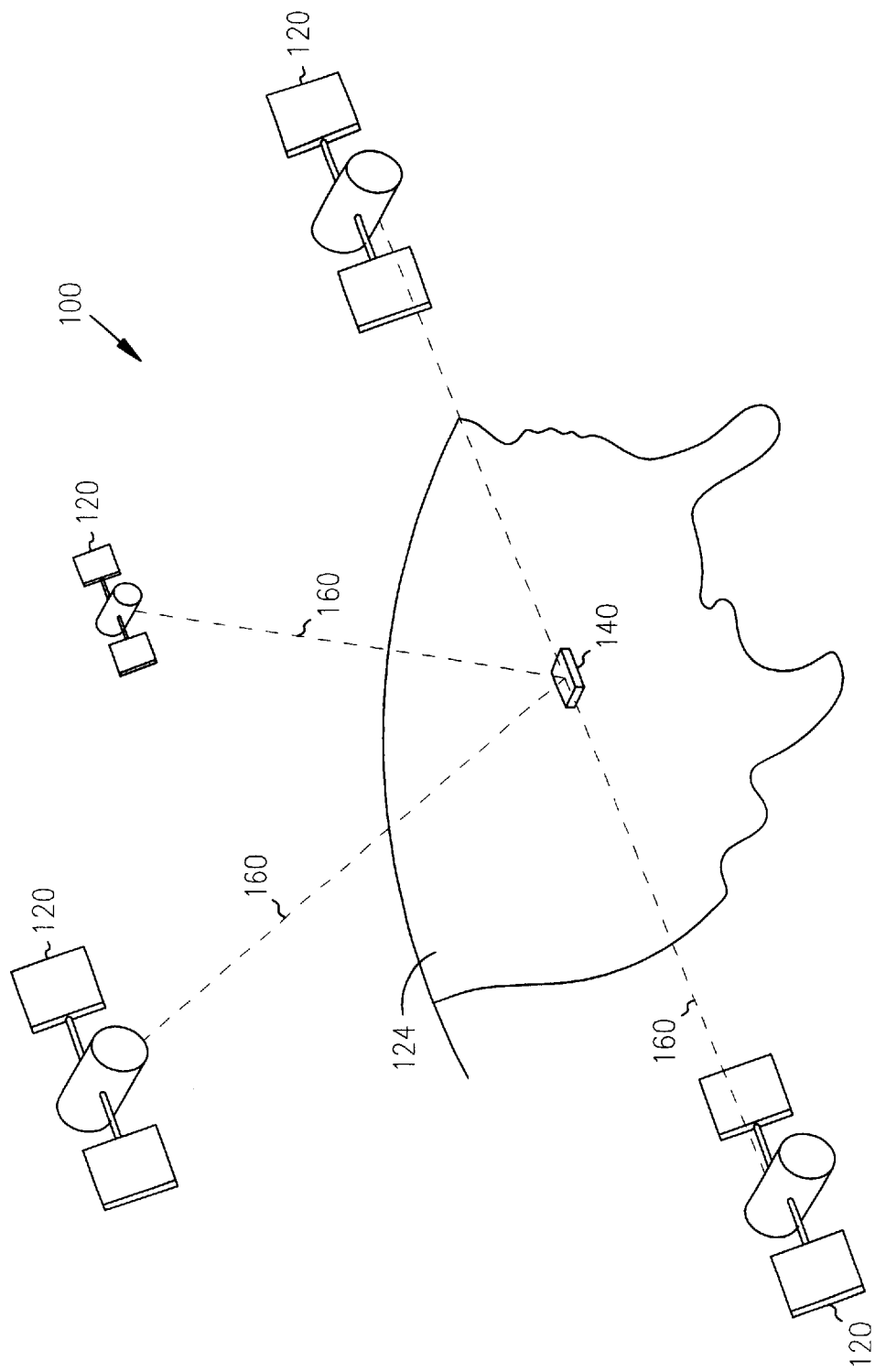
FIG. 1 is a representative view of a Global Positioning System (GPS)

FIG. 1 is representative of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Figure 2A:
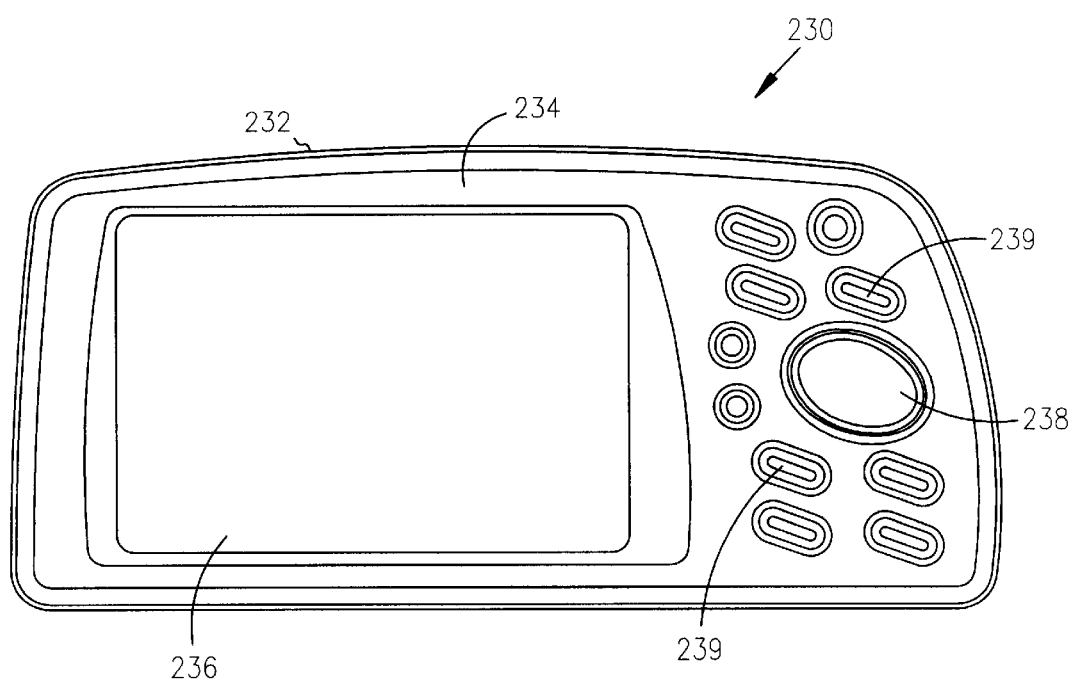
FIGS. 2A and 2B illustrate views for one embodiment of an electronic navigational device according to the teachings of the present invention.
Figure 2B:
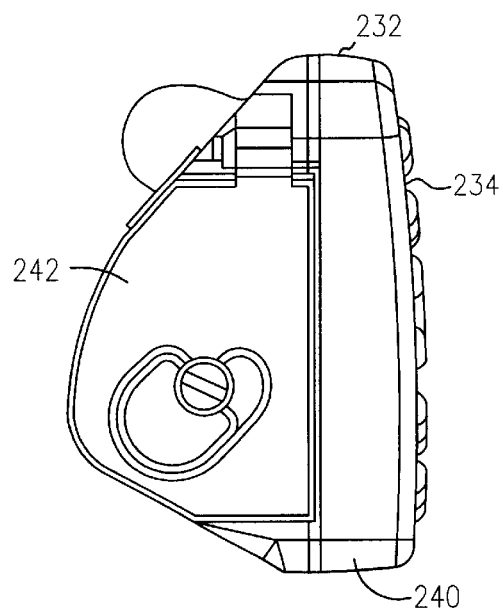

FIGS. 2A and 2B illustrate views for one embodiment of an electronic navigational device 230 according to the teachings of the present invention. As one of ordinary skill in the art will understand upon reading this disclosure, the device can be portable and can be utilized in any number of implementations such as automobile, personal marine craft, and avionic navigation. In the embodiment of FIG. 2A a front view of the navigational device 230 is provided showing the navigational device has a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited. Audio information can likewise be provided in one embodiment.

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of one molded piece to form the device housing 232 and support input key pad 238, other individual keys 239, and display screen 236 in respective access slots shown in the control face 234 of FIG. 2A.

FIGS. 3A–3C illustrate views for another embodiment of an electronic navigational device 310 according to the teachings of the present invention. The navigational device 310 shown in FIGS. 3A–3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A–3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

Thus, FIGS. 2A–2B and 3A–3C are provided as illustrative examples of hardware components for a navigational device according to the teachings of the present invention. However, the invention is not limited to the configuration shown in FIGS. 2A–2B and 3A–3C. One of ordinary skill in the art will appreciate other suitable designs for a hardware device which can accommodate the present invention.

Figure 4A:
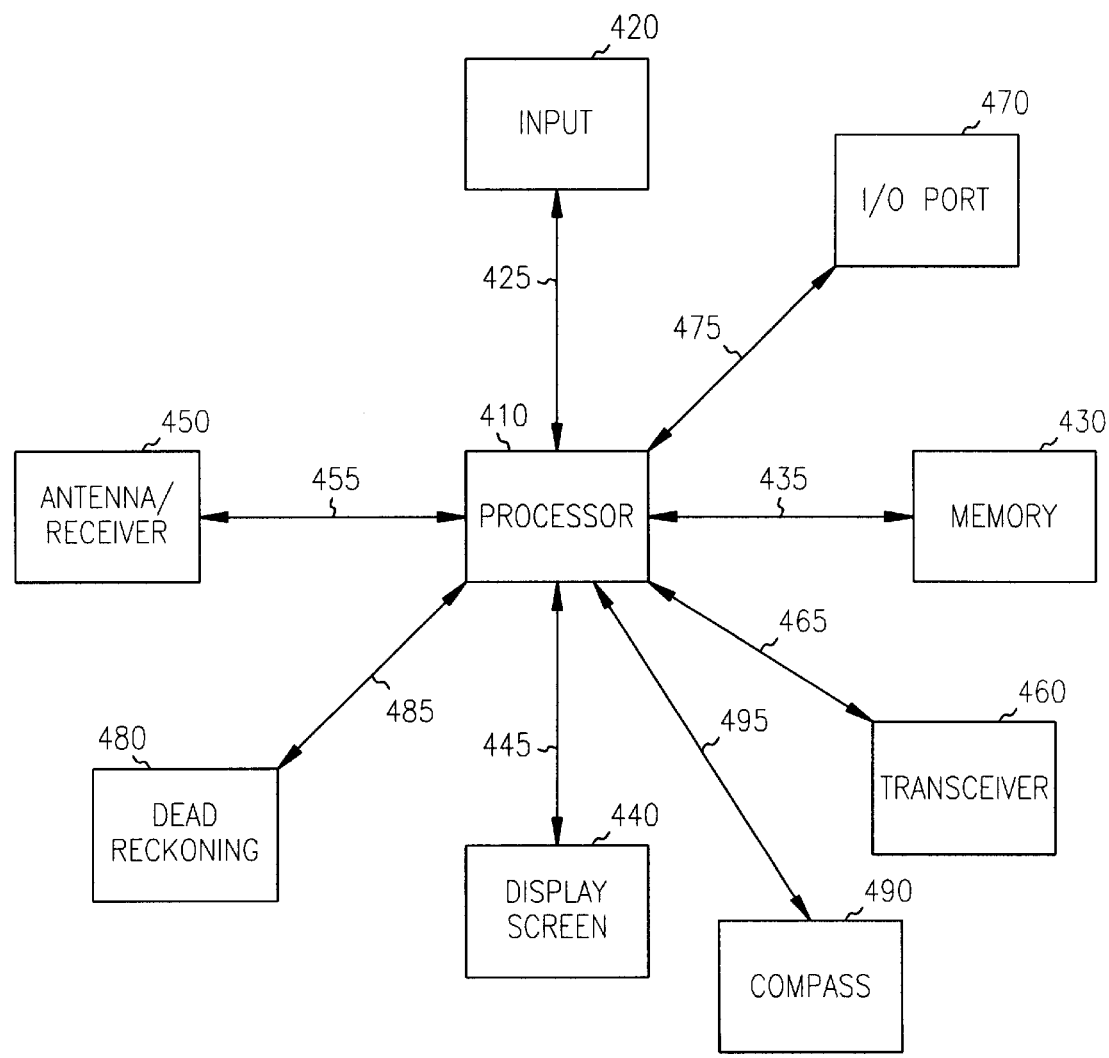
FIG. 4A is a block diagram of one embodiment for the electronic components within the hardware of FIGS. 2A–2B according to the teachings of the present invention.

FIG. 4A is a block diagram of one embodiment for the electronic components within the hardware of FIGS. 2A–2B, such as within housing 332 and utilized by the electronic navigational device. In the embodiment shown in FIG. 4A, the electronic components include a processor 410 which is connected to an input 420, such as keypad via line 425. It will be understood that input 420 may alternatively be a microphone for receiving voice commands. Processor 410 communicates with memory 430 via line 435. Processor 410 also communicates with display screen 440 via line 445. An antenna/receiver 450, such as a GPS antenna/receiver is connected to processor 410 via line 455. It will be understood that the antenna and receiver, designated by reference numeral 450, are combined schematically for illustration, but that the antenna and receiver may be separately located components, and that the antenna may be a GPS patch antenna or a helical antenna. The electronic components of shown in FIG. 4A include a transceiver 460 which is coupled to the processor 410 via line 465. The electronic components further include I/O ports 470 connected to processor 410 via line 475. The components shown in the embodiment of FIG. 4A can further include a compass 490. As one of ordinary skill in the art will understand upon reading this disclosure, the compass 490 can include a magnetic flux gate compass or other electronic compass design and be communicatively coupled to the processor via 495. The electronic components further include at least one dead reckoning component 480 connected to the processor 410 via line 485. According to the teachings of the present invention, the at least one dead reckoning component includes, by way of example and not by way of limitation, a rate gyro, an odometer, pedometer, and/or an accelerometer as the same are known and understood by one of ordinary skill in the art. One of ordinary skill in the art will appreciate, upon reading this disclosure, that other dead reckoning components suited to provide the advantages of the present invention are considered equally within the scope of the present invention.

Figure 4B:
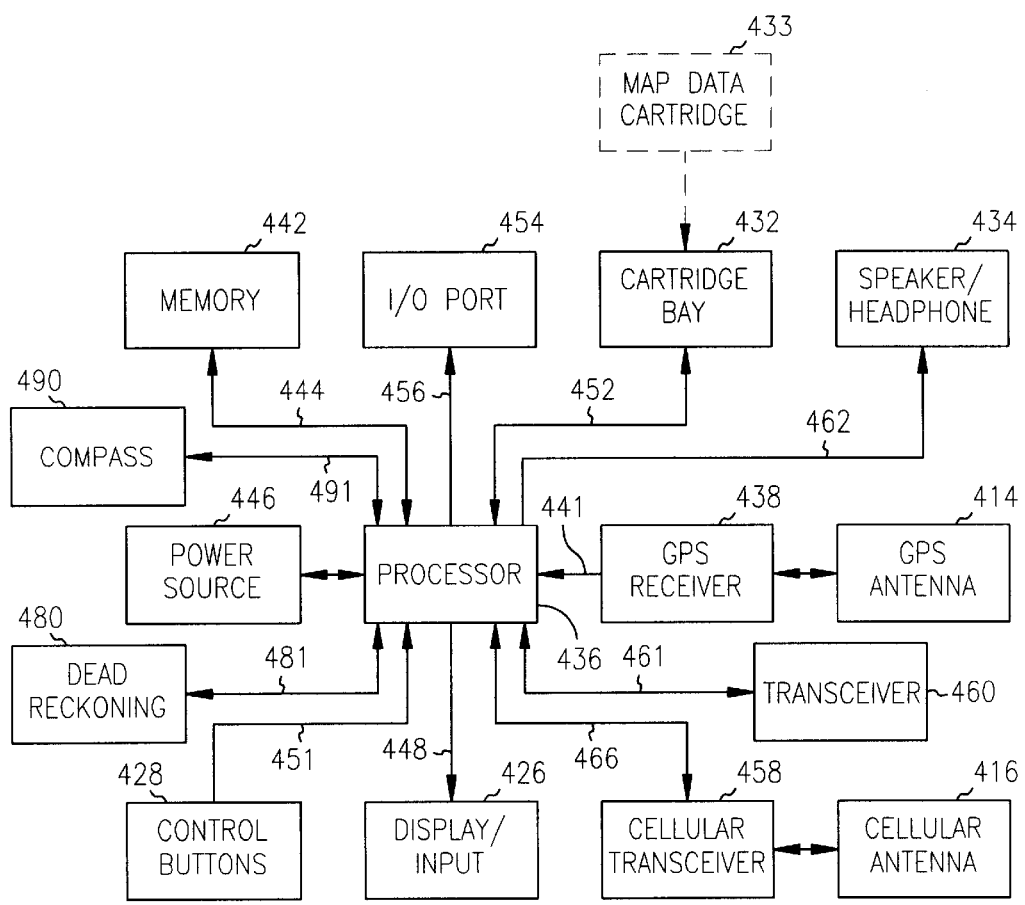
FIG. 4B is a block diagram of one embodiment for the electronic components within the hardware of FIGS. 3A–3C according to the teachings of the present invention.

FIG. 4B is a block diagram of one embodiment for the electronic components within the hardware of FIGS. 3A–3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system (such as PalmOS; Pocket PC) that runs selected software depending on the intended use of the PDA 310. Processor 436 is coupled with memory 442 such as RAM via line 444, and power source 446 for powering the electronic components of PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The components shown in the embodiment of FIG. 4B can further include a compass 490. As one of ordinary skill in the art will understand upon reading this disclosure, the compass 490 can include a magnetic flux gate compass or other electronic compass design and be communicatively coupled to the processor via 491. The PDA 310 may also include an infrared port (not shown) coupled to the processor 436 that may be used to beam information from one PDA to another. The same will be explained in more detail below.

According to the teachings of the present invention, and as shown in the embodiments of FIGS. 4A and 4B, the electronic components of the present invention include a memory, shown as 442 in FIG. 4B, which is adapted to store and/or house a set of executable instructions, programs, and/or program modules. For ease of illustration, the memory will be discussed in reference to FIG. 4B where the memory 442 is coupled to the processor 436 via line 444. As one of ordinary skill in the art will appreciate, the memory 442 is adapted to communicate with the processor 436. In the invention, the memory 442 is further adapted to store or house navigation related data and is adapted to house or store software operable to perform routing algorithms. Examples of such routing algorithms include, but are not limited to, routing algorithms as described in commonly assigned applications entitled; "Systems and Methods for a Navigational Device with Improved Route Calculation Capabilities," application Ser. No. 10/028,057, "Systems and Methods for a Navigational Device with Forced Layer Switching Based on Memory Constraints," application Ser. No. 10/027,159, "Systems and Methods for a Navigational Device with Automated Next Turn Page," application Ser. No. 10/029,917, "Systems and Methods for a Navigational Device with Voice Guidance," application Ser. No. 10/029,732, and "Systems and Methods for a Navigational Device with Detour Routing Capabilities," application Ser. No. 10/028,343, each of which is incorporated herein in full by reference.

According to the teachings of the present invention, the navigation related data includes cartographic data. The cartographic data includes a number of locations and data indicative of thoroughfares of a plurality of types connecting certain ones of the locations. In one embodiment, the navigation related data includes a calculated route between at least two of the number of locations. Further, according to the teachings of the present invention, the software stored or housed within memory 442 includes software operable to perform one or more applications for navigation. As used herein, software operable to perform one or more applications for navigation includes, but is not limited to, software operable to find points of interest. In one embodiment, the navigation related data includes navigation data selected from the group of a number of waypoints, a planned route, and points of interest. In one embodiment, the points of interest include points of interest selected from the group of geographical points of interest, entertainment venues, dining venues, historical points of interest, and lodging venues. In one embodiment, the navigation related data includes navigation data selected from the group of automobile navigation data, marine craft navigation data, pedestrian navigation data, and hiking navigation data.

In one embodiment, the device is GPS enabled. In this embodiment, the software is operable to calculate an estimated time of arrival of the device to the a desired destination using an integrated GPS capability of the device.

In some embodiments of the invention, the memory 442 is adapted to store or house software operable to perform handheld computing operations. Examples of such handheld computing operations include those typically found within the functionality of a handheld computing device such as; retrieving an address from an address book, entering an address in an address book, retrieving a phone number from a phone list, adding a phone number to the phone list, and adding an entry in a to-do list.

However in some embodiments, the memory 442 in the present invention is further adapted to store or house software operable for adding a waypoint as an address in the address book, adding a point of interest as an address in the address book, and storing a planned route. For example, the software, embodied as a computer executable set of instructions, are adapted to identify a waypoint based on a triangulation positioning determined location and then create an address book entry to be associated with the identified waypoint. Similarly, the software is adapted to identify a waypoint based on a cursor position on an electronic map and then to create an address book entry to be associated with the identified waypoint. Further, the software is adapted to create an address book entry, and then identify a waypoint associated with the address book entry. Detailed discussions of the same are described in a commonly assigned application entitled; "PDA Integrated Address Book and Electronic Map Waypoints," application Ser. No. 10/032,032, which is incorporated in full herein by specific reference.

According to the teachings of the present invention, and as shown in the embodiments of FIGS. 4A and 4B, the electronic components of the present invention include a transceiver shown as 460 which is coupled to the processor. For ease of illustration, the transceiver will be discussed in reference to FIG. 4B where the transceiver 460 is couple to the processor 436 via line 461. The description, however, applies analogously to the electronic components shown in FIG. 4A. As stated above, the memory is adapted to store or house software. According to the teachings of the present invention, software is provided which includes a set of executable instructions, programs, and or program modules adapted to control transceiver 460 such that the transceiver 460 can transmit and receive navigation data between a handheld electronic device and an other portable and/or handheld device. For example, in one embodiment, the software includes a set of executable instructions adapted to transmit and receive the navigation related data via a commercial communications network.

One example of a commercial communications network includes an analog cellular network using plain old telephone service (POTS). Another example of a commercial communications network to which the present invention is adapted includes a digital packet switched cellular network such as a personal communications service (PCS) network. As one of ordinary skill in the art will understand upon reading this disclosure, the transceiver 460 of the present invention is adapted to transmit and receive navigation related data via the Internet using Internet Protocol (IP). Thus, the present invention includes a handheld electronic device which is adapted to transmit and receive navigation related data over a wide area network (WAN) using any number or combination of hardwired and/or wireless communication channels. For instance, the transceiver of the present invention is adapted to transmit and receive navigation related data using a wireless application protocol (WAP). However, as one of ordinary skill in the art will understand upon reading and comprehending this disclosure, the invention is not limited to single one or particular combination of WAN communication channels or protocols. That is the transceiver can be instructed to transmit and receive navigation related data in a 3G GSM/CDMA network, and other networks of the like.

Similarly, according to the teachings of the present invention, the transceiver 460 is adapted to transmit and receive navigation related data over a local area network (LAN). In this embodiment, the transceiver 460 is adapted to operate in a short range network and wirelessly transmit and receive the navigation related data between a handheld electronic device and an other portable and/or handheld electronic device using either infra-red signaling and/or a Bluetooth signaling technology as the same are know and understood by one of ordinary skill in the art. The invention is not so limited. As one of ordinary skill in the art will understand upon reading this disclosure, the portable and/or handheld electronic devices described herein include multipurpose devices, e.g. PDAs, cell phones and other intelligent appliances/apparel of the like, which can wirelessly transmit navigation related data from one such device to another. That is, in one embodiment, according to the teachings of the present invention, the handheld electronic device includes devices selected from the group of cell phones, intelligent apparel, and PDAs. In one embodiment, the other portable and/or handheld electronic device similarly includes devices selected from the group of radios, cell phones, intelligent apparel, and PDAs.

According to the teachings of the present invention, and as shown in the embodiments of FIGS. 4A and 4B, the electronic components of the present invention include at least one dead reckoning component shown as 480 which is coupled to the processor. For ease of illustration, the at least one dead reckoning component 480 will be discussed in reference to FIG. 4B where the at least one dead reckoning component 480 is coupled to the processor 436 via line 481. The description, however, applies analogously to the electronic components shown in FIG. 4A. As stated above, the memory is adapted to store or house software. According to the teachings of the present invention, software is provided which includes a set of executable instructions, programs, and or program modules adapted to control the dead reckoning component 480 such that the dead reckoning component 480 can be activated and provide navigation services to the device.

As identified herein, the present invention provides a portable electronic device which includes both a triangulation positioning and a dead reckoning positioning functionality. In one embodiment, the triangulation positioning functionality includes a GPS functionality and the dead reckoning functionality includes a rate gyro. The invention, however, is not so limited. In the invention, the processor of the device is adapted to operate on a set of computer executable instructions to determine, or resolve, a position of the device when the triangulation positioning service and/or signals are available. The processor of the device further adapted to operate on the set of computer executable instructions to determine, or resolve, a position of the device using the dead reckoning functionality when the triangulation positioning functionality is interrupted or otherwise degraded. Thus, the triangulation positioning functionality and the dead reckoning positioning functionality are adapted to operate in complement to one another. In some embodiments, one of either the triangulation positioning functionality or the dead reckoning positioning functionality can be used to calibrate the other functionality when the one exhibits a high level of accuracy or when a high level of confidence in accuracy is determined within the particular one. In example, when a high level of accuracy or a high level of confidence is determined from the triangulation positioning functionality, such as receiving a number of strong GPS signals, those same strong GPS signals as part of the triangulation functionality can be used to calibrate the dead reckoning functionality. In this manner the present invention allows for the device to continue processing and/or tracking a location or position of the device when such triangulation positioning services are interfered with such as in "urban canyons" or otherwise when the triangulation positioning signals are unavailable. Thus, the device can continue navigating a route or otherwise provide navigation related data and services as the same is described herein.

As shown in FIGS. 4A and 4B, the device further includes a display in communication with the processor and the memory, e.g. display 426 in FIG. 4B. The display is adapted to display all or part of a "convergence" and/or a "solution." As used herein, the terms convergence and/or solution are intended to mean a complete path provided by the thoroughfares of a plurality of types connecting certain ones of the number of locations in the cartographic data. According to the teachings of the present invention, the device incorporates these and other functions as will be explained in more detail below in connection with FIGS. 6–7.

Figure 5A:
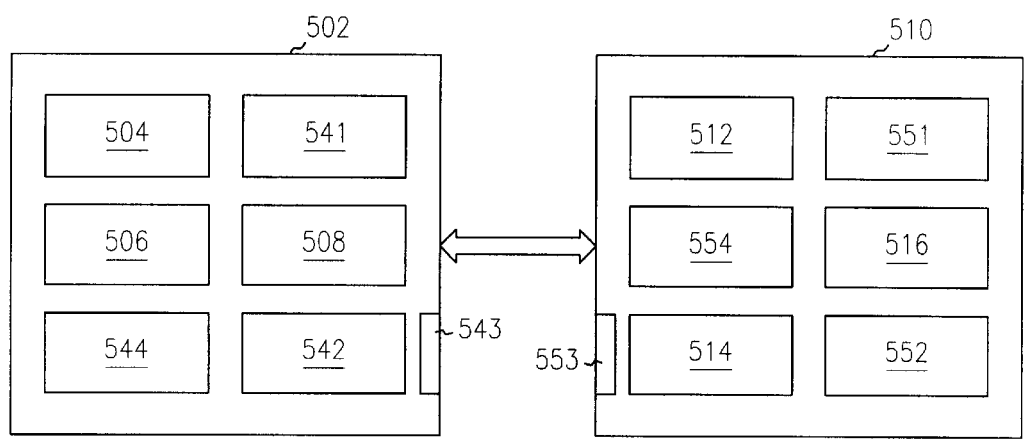
FIG. 5A is a block diagram of one embodiment for a navigation system according to the teachings of the present invention.

FIG. 5A is a block diagram of an embodiment of a navigation system according to the teachings of the present invention. As explained in the background, there is a need for a navigation system which integrates complementary positioning functions, e.g. that incorporate a triangulation positioning functionality with a dead reckoning positioning functionality such that the system can continue to provide navigation related services in "urban-canyons" or otherwise when a primary positioning service is interrupted. As stated above, it is desirable that such a system be adapted to incorporate existing portable electronic map and navigation device services with existing vehicle positioning equipment in a manner which affords more complete and reliable navigation services to a wider range of consumers. The following description provides a number of inventive solutions for fulfilling this need.

As shown in the embodiment of FIG. 5A, the invention includes a navigation system which includes a first and a second navigation device, 502 and 510. According to the teachings of the present invention, the first and the second navigation devices, 502 and 510, include mobile navigation devices. As one of ordinary skill in the art will understand upon reading this disclosure, the second navigation device 510 includes a second mobile navigation device which can be removably situated in the first mobile navigation device 502.

It is noted that the terms first and second navigation devices, as used herein, are employed to distinguish attributes of one navigation device in relation to another. However, the numerical designation (first or second) is not strictly dedicated to one particular navigation device. The numerical reference associated with a given navigation device can be swapped with the numerical reference of the other without affecting the particular attributes or functional relationships between the navigation devices. Thus, the second navigation device with all of its below described features can be equally redefined as the first navigation device and the first navigation device with all of its below described features can be equally redefined as the second navigation device. As one of ordinary skill in the art will understand upon reading this disclosure, if this is done, it is then the first mobile navigation device in this embodiment which can be removably situated in the second mobile navigation device. The invention is not so limited.

In the embodiment of FIG. 5A, the first navigation device 502 includes at least one positioning functionality 541 and the second navigation device 510 includes at least one positioning functionality 551. In one embodiment of FIG. 5A, the first navigation device 502 includes a navigation device integrated into an automobile. However, the invention is not so limited, and in alternative embodiments, the first navigation device 502 includes a navigation device integrated into a marine craft and or other vehicle of the like. In an alternative embodiment of FIG. 5A, the first navigation device includes a handheld, portable navigation device in the form of a cradle which can be removably positioned in a vehicle, e.g. automobile or marine craft.

In one embodiment of FIG. 5A, the at least one positioning functionality 541 of the first navigation device 502 includes one or more dead reckoning components 541. According to the teachings of the present invention, the one or more dead reckoning components include at least one of a distance determination sensor and an orientation sensor. In the embodiment where the one or more dead reckoning components are integrated in an automobile, the distance determination sensor includes at least one sensor selected from the group of an odometer and a speedometer, and the orientation sensor includes at least one sensor selected from the group of a rate gyro and a differential sensor communicatively coupled to a wheel of a vehicle. One of ordinary skill in the art will comprehend from reading this disclosure, analogous components integral to a marine craft or other vehicle, and the same are intended within the scope of the present invention. Thus, in one embodiment according to the teachings of the present invention, existing vehicle components are integrated into a complementary navigation system. Likewise, in the embodiment where the one or more dead reckoning components are integrated in a handheld, portable navigation device in the form of a cradle which can be removably positioned in or on a vehicle, the distance determination sensor can include an accelerometer, and the orientation sensor can include a rate gyro. The same are provided by way of example and not by way of limitation. One of ordinary skill in the art will appreciate, upon reading this disclosure, the number of additional dead reckoning components 541 which can be included in the first navigation device 502. According to the teachings of the present invention, when the second navigation device 510 is removable situated in the first navigation device 502 the second navigation device 510 can detect and use, in some embodiments automatically, input information, or data, from the one or more dead reckoning components 541 in complement to the at least one positioning functionality of the second navigation device to provide a better, more reliable navigation position service. Thus, navigation and positioning functions can still occur when a triangulation positioning functionality (discussed more below) of the second navigation device 510 is degraded or triangulation positioning signals are interrupted.

According to one embodiment of the present invention, the first navigation device 502 includes a processor 504, a memory 506, and a transceiver 508 adapted to communicate with one another. In some of the embodiments discussed above, the first navigation device 502 includes wireless capabilities. Whether the second navigation device is physically or wirelessly interfaced to the first navigation device 502, the second navigation device 510 can transmit and receive information and data signals to and from the first navigation device 502. Thus, the second navigation device 510 can receive information signals from the one or more dead reckoning components 541, e.g. rate gyro, accelerometer, odometer, speedometer, and/or differential wheel sensors of the first navigation device 502 to complement the at least one positioning functionality 551 , e.g. triangulation positioning functionality of the second navigation device 510.

By way of example and not by way of limitation, the triangulation positioning functionality 551 in the second navigation device 510 includes a GPS functionality. As discussed above, normally with GPS multiple satellites are needed to resolve a position. A minimum of three are needed for two-dimensional positioning, but preferably four or more are used for three-dimensional positioning and to acquire the proper triangulation, e.g. avoid shading or weak signal strength. Thus in one embodiment, if the triangulation positioning functionality 551 in the second navigation device were only receiving signals from one or two satellites, the second navigation device 510 can still navigate using the information signals received from the one or more dead reckoning components 541 in the first navigation device 502. In other words, an orientation component, such as differential wheel sensors (e.g. those used in some ABS systems) or a rate gyro, included among the one or more dead reckoning components 541, can supplement data on the direction of travel and a distance determination component, such as an accelerometer, odometer, and/or speedometer among the one or more dead reckoning components 541, can supplement data on the distance of travel. In this manner, the device can predict what it should be receiving in the delta of the triangulation positioning signal and correlate the supplemental data from the first navigation device 502 to continue accurate and uninterrupted navigation service. In one embodiment, as explained in more detail below, the first navigation device 502 includes at least one dead reckoning component 541 and at least one triangulation positioning component 542. In one embodiment, the second navigation device includes at least one triangulation positioning functionality 551 and at least one dead reckoning component 552 as well.

In some embodiments of the present invention, the memory 506 is adapted to store navigation related data. The navigation data includes navigation data as explained and described in detail above in connection with FIGS. 4A and 4B. Thus, the navigation related data includes cartographic data including a number of locations and data indicative of thoroughfares of a plurality of types connecting certain ones of the locations. And, in some embodiments, the memory 506 is adapted to store software including software operable to perform routing algorithms, and other navigation related applications as the same have been described herein.

As shown in FIG. 5A, the navigation system of the present invention includes a second navigation device 510. As mentioned above, the second navigation device 510 can be removably situated in the first navigation device 502. In one embodiment, as described herein, the second navigation device 510 is adapted to wirelessly communicate with the first navigation device 502. As described herein, the first and the second navigation devices, 502 and 510, are adapted to communicate navigation related data wirelessly using a communication technology selected from the group of infra-red signaling, cellular technology, Bluetooth technology, and microwave technology. In another embodiment, the second navigation device 510 can cradle with a cable and or plug-in as the same will be known and understood by one of ordinary skill in the art. In this embodiment, the first navigation device 502 and the second navigation device 510 includes a connector, e.g. 543 and 553 respectively, which can connect to a physically wired bus as the same will be known and understood by one of ordinary skill in the art.

According to the teachings of the present invention, the second navigation device 510 includes, but is not limited to a second navigation device 510 selected from the group of a cell phone, a PDA, an intelligent appliance, an article of intelligent apparel, or any thin client of the like. As described above, in one embodiment the second navigation device 510 can removably, physically interface to the first navigation device 502. And, as described above, in one embodiment the second navigation device 510 can removably, wirelessly interface with the first navigation device 502 and communicate navigation related data wirelessly using a communication technology selected from the group of infra-red signaling, cellular technology, Bluetooth technology, and microwave technology. Thus, once interfaced, the first navigation device 502 can transmit navigation related data to a second navigation device 510, e.g. a multifunction smart phone, such that the multifunction smart phone can display a position of the first and the second navigation devices, 502 and 510. The second navigation device 510 can further display a calculated route to a desired destination and can navigate the route using visual and audio guidance.

As one of ordinary skill in the art will understand upon reading this disclosure, the second navigation device 510 includes a second navigation device having hardware and electronic components as described in detail above in connection with FIGS. 2A–4B. That is, the second navigation device 510 includes a processor 512, a memory 514, and a transceiver 516 adapted to communicate with one another. According to one embodiment of the present invention, the memory 514 is adapted to store navigation related data. The navigation data includes navigation data as explained and described herein. And, in some embodiments, the memory 514 is adapted to store software including software operable to perform routing algorithms, and other navigation related applications as the same have been described herein.

According to the wireless embodiments of the present invention, the transceivers, 508 and 516, in the first and the second navigation devices, 502 and 510, are adapted to transmit and receive the navigation related data, as well as positioning information data, wirelessly between the first and the second navigation devices, 502 and 510 as explained and describe in detail above. That is, the transceivers, 508 and 516, are adapted to transmit and receive the navigation related data and positioning information data wirelessly using a communication technology selected from the group of infra-red signaling, RF signaling, cellular based signaling (whether digital and/or analog), Bluetooth signaling, and microwave signaling over LANs or WANs.

As discussed above, in one embodiment the navigation related data includes navigation data selected from the group of automobile navigation data, marine craft navigation data, pedestrian navigation data, and hiking navigation data. In one embodiment, the navigation related data includes navigation data selected from the group of a number of waypoints, a planned route, and points of interest.

According to some embodiments of the present invention, at least one of the first and the second navigation devices, 502 and 510, includes a GPS enabled handheld device. And, as stated above, the memory, 506 and/or 514, is adapted to house or store software operable to perform routing algorithms. Thus, according to the teachings of the present invention, the at least one of the first and the second GPS enabled handheld devices, 502 and 510, is adapted to use the above described software for performing routing algorithms and to track a location or position of the first and the second thin client, 502 and 510, and provide other navigation related applications and data within a single vehicle.

As one of ordinary skill in the art will appreciate upon reading this disclosure and as explained in more detail below, the first and the second navigation devices, 502 and 510, can transmit and/or receive a calculated route between one another. Moreover, as one of ordinary skill in the art will appreciated and as will be described in more detail below, at least one of the first and the second navigation devices, 502 and 510, can track the location of the first and the second navigation devices, 502 and 510, while the two are in motion, along a calculated route or otherwise.

In one embodiment, by way of illustration and not by way of limitation, the triangulation positioning functionality 551 of the second thin client 510 includes a GPS receiver 551. According to the teachings of the present invention, the second navigation device 510 is adapted to receive navigation related data, using transceiver 516, from the first navigation device 502 and has software stored or housed in memory 514 which is operable on the received navigation related data to perform a route calculation between two or more locations, to find a point of interest and calculate a route to the same, and to track a location of the first and the second navigation devices, 502 and 510, using the GPS receiver 551 in the second navigation device 510.

In another embodiment, the second navigation device 510 is adapted to receive a route, using transceiver 516, from the first navigation device 502, the route having been calculated in the first navigation device 502 using software stored or housed in the memory 506 of the first navigation device 502. The second navigation device 510 is further operable on the received route to track a location of the first and the second navigation devices, 502 and 510, along the route or otherwise, e.g. off route, using the GPS receiver 551 in the second navigation device 510. Similarly, the second navigation device 510 is adapted to operate on navigation related data received from the first navigation device 502 to calculate a new route to a new desired destination, and display a location of the first and second navigation devices, 502 and 510, on a display, e.g. 544 and 554, provided integrally with either the first and/or second navigation devices.

As one of ordinary skill in the art will understand upon reading this disclosure, the above described operations, according to the teachings of the present invention, can equally be performed in the reverse sequence order or direction of communication and operation between the first and the second navigation devices, 502 and 510. The invention is not so limited. Thus, one of ordinary skill in the art will appreciate the manner in which the present invention provide for complementary, mobile navigation devices in a system which incorporate triangulation positioning functionality and one or more dead reckoning positioning components, e.g to provide complementary navigation related services such that the system can continue to provide complete and reliable navigation related services in "urban-canyons" or otherwise when a primary positioning service is interrupted or otherwise degraded.

Figure 5B:
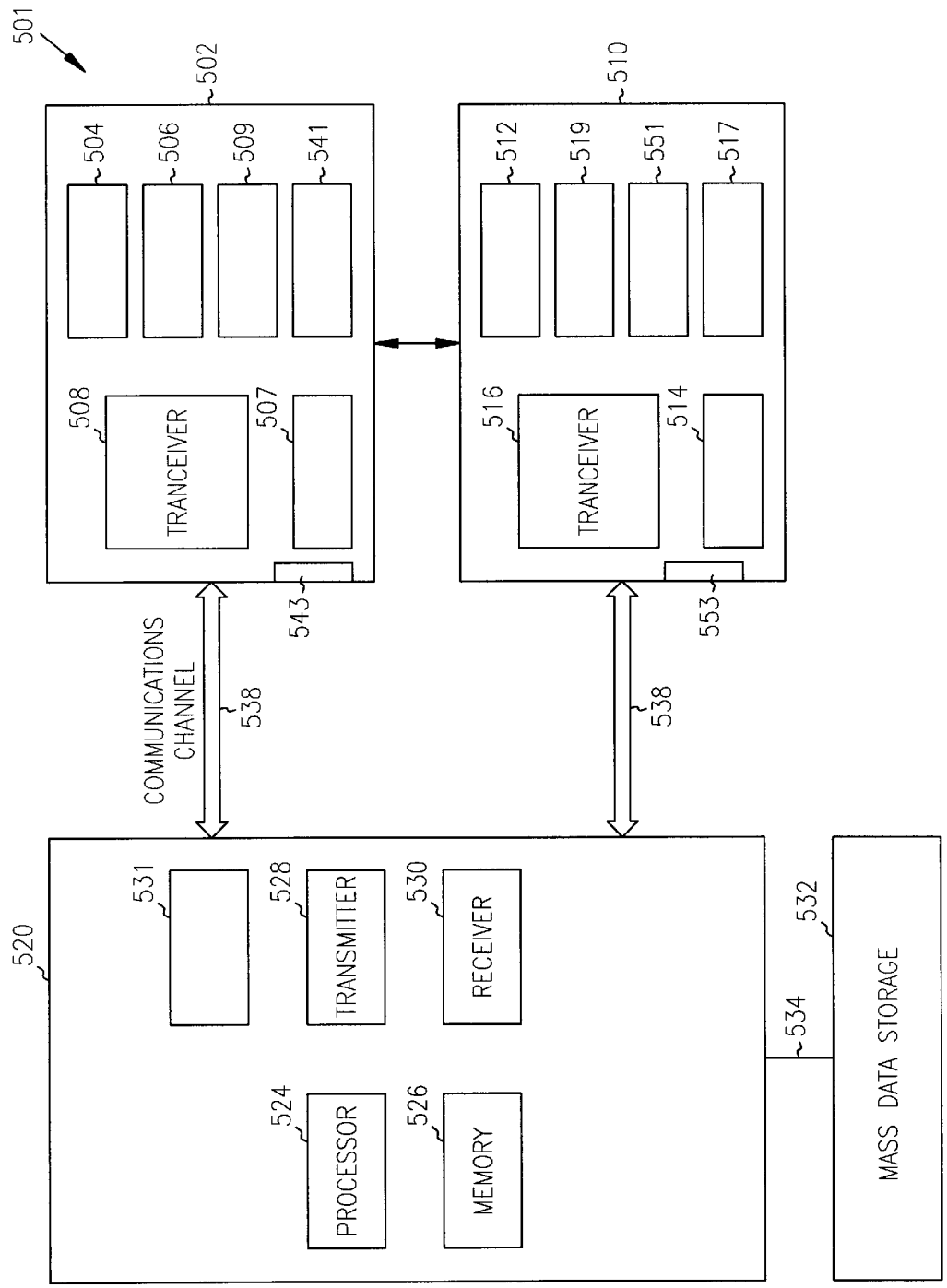
FIG. 5B is a block diagram of another embodiment for a navigation system according to the teachings of the present invention.

FIG. 5B is a block diagram of another embodiment of a navigation system 501 according to the teachings of the present invention. In the embodiment of FIG. 5B, the invention includes a navigation system 501 having a first and a second navigation device, 502 and 510 as the same have been described and explained in detail above in connection with FIG. 5A. That is, the first navigation device 502 includes a processor 504, a memory 506, and a transceiver 508 adapted to communicate with one another. Likewise, the second navigation device 510 includes a processor 512, a memory 514, and a transceiver 516 adapted to communicate with one another. In the embodiment of FIG. 5B, at least one of the first and the second navigation devices, 502 and 510, include a triangulation positioning component, 507 and 517 respectively, as well as a display, 509 and 519 respectively. In the embodiment of FIG. 5B, at least one of the first and the second navigation devices, 502 and 510, include a dead reckoning positioning component, 541 and 551 respectively. As described herein, in one embodiment, the triangulation positioning component, 507 and/or 517 respectively, includes a GPS receiver, 507 and/or 517, and the dead-reckoning positioning component, 541 and/or 551 respectively, includes at least one sensor selected from the group of a distance determination sensor and an orientation sensor. The orientation sensor can include an orientation sensor selected from the group of a differential wheel sensor attached to two wheels of a vehicle and/or a rate gyro, and the distance determination sensor can include a distance determination sensor selected from the group of an accelerometer, odometer, and/or speedometer. In this manner, the first and second navigation devices, 502 and 510, can complement one another to provide more reliable and precise positioning information data. That is, the complementary navigation devices, 502 and 510, in system 501 can predict what positioning information data should be being received in the delta of a triangulation positioning signal received by one of the navigation devices, 502 and 510, when such a signal is degraded and can correlate the supplemental positioning information data from the dead reckoning positioning component, 541 and/or 551 respectively, such that the system 501 can continue to provide accurate and uninterrupted navigation service.

In the embodiment of FIG. 5B, the navigation system 501 includes a larger remote client 520, such as a desktop computer, laptop computer, and/or server 520. According to one embodiment, the larger client, e.g. server 520, includes a processor 524 operably coupled to memory 526, and further includes a transmitter 528 and a receiver 530 to send and receive data, communication signals, and/or other propagated signals. The transmitter 528 and receiver 530 are selected or designed according to the communication requirements and the communication technology used in the communication design for the navigation system 501. As one of ordinary skill in the art will understand upon reading this disclosure, the functions of the transmitter 528 and the receiver 530 may be combined into a single transceiver.

According to some embodiments of the present invention, the remote client includes a remote server 520. In some embodiments, the server 520 includes a network server located on a local area network (LAN), wide area network (WAN), a virtual private network (VPN) and server farms. As described herein the server 520 is adapted to communicate with the first and the second navigation devices, 502 and 510. According to the teachings of the present invention, the remote server memory 526 is adapted to store navigation related data. As described above, the navigation related data includes, among other things, cartographic data including a number of locations and data indicative of thoroughfares of a plurality of types connecting certain ones of the locations. Further, the remote server memory 526 is adapted to store software including software operable to perform routing algorithms as the same have been described above. In one embodiment of the present invention, the remote server processor 524 operates on a route calculation algorithm, stored or housed in memory 526 to find a convergence between any two of the number of locations.

In one embodiment according to the teachings of the present invention, and as shown in FIG. 5B, the system 501 further includes a mass data storage 532 which is adapted to store navigation data. In this embodiment, the remote server 520 and at least one of the first and the second navigation devices, 502 and 510, (shown here as first thin client 502) are adapted to communicate with, e.g. to transmit and receive, navigation data back and forth between one another via a communication channel 538. In one embodiment according to the teachings of the present invention, the communication channel 538 includes a wireless channel. As one of ordinary skill in the art will understand upon reading this disclosure, the communication channel 538 is not limited to a particular communication technology. Additionally, the communication channel 538 is not limited to a single communication technology; that is, the channel 538 may include several communication links that use a variety of technology. For example, according to various embodiments, the communication channel 538 is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, the Internet, radio-frequency (RF) waveguides, the atmosphere, and empty space. Furthermore, according to various embodiments, the communication channel 538 includes intermediate devices such as routers, repeaters, buffers, modems, transmitters, and receivers, for example.

In one embodiment, for example, the communication channel 538 includes telephone and computer networks. Furthermore, in various embodiments, the communication channel 538 is capable of accommodating wireless communication such as radio frequency, microwave frequency and infrared communication, and the like. Additionally, according to various embodiments, the communication channel 538 accommodates satellite communication.

In the invention, the communication signals transmitted through the communication channel 538 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), third generation (3G) GSM/CDMA, and the like. Both digital and analog signals may be transmitted through the communication channel 538. According to various embodiments, these signals are modulated, encrypted and/or compressed signals as may be desirable for the communication technology.

According to some embodiments of the present invention, the server processor 524 is,adapted to respond to a request from the first and/or second navigation devices, 502 and 510, by performing calculations on the cartographic data and transmitting results, using transmitter 528, to at least one of the first and the second navigation devices, 502 and 510. According to the teachings of the present invention, the server 520 is adapted to transmit, and the at least one of the first and the second navigation devices, 502 and 510 is adapted to receive, the navigation data in a manner as explained and described in detail above in connection with FIGS. 4A and 4B. In one embodiment of the present invention, the remote server processor 524 operates on a route calculation algorithm, stored or housed in memory 526 to find a convergence between any two of the number of locations. Thus, according to the teachings of the present invention, server memory 526 is adapted to house or store software which provides instructions for the processor 524 and allows the server 520 to provide services to the first and the second navigation devices, 502 and 510.

Additionally, in some embodiments of the present invention, at least one of the first and the second navigation devices, 502 and 510, is adapted to transmit navigation related data to the server 520 in a manner as explained and described in detail above in connection with FIGS. 4A and 4B. Thus, at least one of the first and the second navigation devices, 502 and 510, is adapted to transmit track logs and the like to server 520 for storage and/or processing. Reciprocally, at least one of the first and the second navigation devices, 502 and 510, is adapted to communicate with and retrieve navigation data from the remote server 520 using cellular communication technology, e.g. a PCS digital cellular packet switched service. Further, the first and the second navigation devices, 502 and 510, are adapted to transmit and receive navigation related data between one another using transceivers, 508 and 516 respectively, in a manner as explained and described in detail above in connection with FIGS. 4A–5A. In the embodiment of FIG. 5B, the first and the second navigation devices, 502 and 510, are incorporated into the described larger system. However, according to the teachings of the present invention, the first and the second navigation devices, 502 and 510, still complement one another and are adapted to resolve a position of the first and the second mobile navigation devices, 502 and 510, by cooperatively employing a triangulation positioning functionality and one or more dead reckoning positioning components. As described herein in one embodiment, the first and the second navigation devices, 502 and 510, are adapted to resolve a position of the first and the second mobile navigation devices, 502 and 510, using the one or more dead reckoning components of the first mobile navigation device 502 when the triangulation positioning functionality of the second mobile navigation device 510 is interrupted or otherwise degraded.

In one embodiment, the system 501 includes a set of computer executable instructions, e.g. software, resident thereon and operable on the first and the second navigation devices, 502 and 510, for selecting between using the first and the second navigation devices, 502 and 510. In one embodiment, the software operable for selecting between using the first and the second navigation devices, 502 and 510, includes software operable for resolving which of the first and the second navigation devices, 502 and 510, is providing a better set of position data. In one embodiment, the software operable for resolving which of the first and the second navigation devices, 502 and 510, is providing a better set of position data includes software operable according to a set of algorithms for; resolving whether the first navigation device 502 is receiving triangulation positioning signals, resolving whether the second navigation device 510 is receiving triangulation positioning data, and resolving whether either of the first and the second navigation devices, 502 and 510 are producing dead reckoning position data.

In this manner, the first and the second navigation devices, 502 and 510, afford complementary navigation related services such that a system, or even single vehicle, containing the first and the second navigation devices, 502 and 510, can continue to obtain complete and reliable navigation related services in "urban-canyons" or otherwise when a primary positioning service is interrupted.

As shown in the embodiment of FIG. 5B, the navigation system 501 further includes a mass data storage 532 coupled to the server 520 via communication link 534. The mass data storage 532 is adapted to store or house navigation data. One of ordinary skill in the art will understand, upon reading and comprehending this disclosure, that the mass data storage 532 can be a separate device from the server 532 and/or can be incorporated into the server 520.

According to one embodiment of the present invention, one service provided by the server 520 involves processing requests from the first and the second navigation devices, 502 and 510, and transmitting navigation data from the mass data storage 532 to the first and the second navigation devices, 502 and 510. According to one embodiment, another service provided by the server 520 includes processing the navigation data using various algorithms for a desired navigation application, e.g. performing a route calculation or finding points of interest, and sending the results of the processing to the first and the second navigation devices, 502 and 510.

In this embodiment of the present invention, the mass data storage 532 includes sufficient memory for a multitude of desired navigation applications. Examples of mass data storage 532 include magnetic data storage media such as hard drives, optical data storage media such as CD ROMs, charge storing data storage media such as Flash memory, and include molecular memory, such as now known or hereinafter developed.

As one of ordinary skill in the art will understand upon reading this disclosure, the systems in FIGS. 5A and 5B can further operate on signals, e.g. GPS signals, originally received by the first and the second navigation devices, 502 and 510. As one of ordinary skill in the art will understand upon reading and comprehending this disclosure, a user of the first and the second navigation devices, 502 and 510, can be proximate to or accompanying the first and the second navigation devices, 502 and 510. The invention however, is not so limited.

As one of ordinary skill in the art will appreciate upon reading this disclosure, the first and the second navigation devices, 502 and 510, are adapted to display the navigation related data on their respective displays, e.g. 544 and 554. Thus, in one embodiment of the present invention, the first and the second navigation devices, 502 and 510, are adapted to display a route calculated using the software housed or stored in the memory 526 of the remote server 520. Additionally, the first and the second navigation devices, 502 and 510, are adapted to display a route calculated on one or the other of the first and the second navigation devices, 502 and 510. For example, the first navigation device 502 is adapted to calculate a route, find a point of interest, retrieve a map, or perform any other related navigation application and then transmit the results to the second navigation device 510 using its transceiver, as the same has been described in detail above, where the navigation related results will be displayed.

Likewise, the server 520 can calculate a route, find a point of interest, retrieve a map, or perform any other related navigation application upon receiving a request from the first and the second navigation devices, 502 and 510, even retrieving navigation relate data from the mass storage device 532, and then transmit the results to the first and the second navigation devices, 502 and 510, where the navigation related results will be displayed.

According some embodiments of the present invention, the first and the second navigation devices, 502 and 510, which are GPS enabled having GPS components 507 and 517, are adapted to display, on a respective display such as 544 and 554, a location of the first and the second navigation devices, 502 and 510, on a cartographic map. Further, according to the teachings of the present invention, the first and the second navigation devices, 502 and 510, are adapted to transmit the location of the first and the second navigation devices, 502 and 510, in the manner described in detail above, to any one or more additional thin clients and any number of remote servers, e.g. server 520, to be displayed thereon on a cartographic map. In the invention, the same is independent of where the navigation related data is operated upon and is independent of which of the first and the second navigation devices, 502 and 510, is GPS enabled and employing its GPS component, e.g. 507 and 517, or which of the first and the second navigation devices, 502 and 510, includes one or more dead reckoning components, 541 and 551, in complement thereto, to track a location of the first and the second navigation devices, 502 and 510.

Thus, by way of example and not by way of limitation, in one embodiment of the present invention a route is calculated on the second navigation device 510, operating on a set of navigation data received by the second navigation device 510, using transceiver 516, from the first navigation device 502. The second navigation device 510, using its GPS component, tracks a location of the first and the second navigation devices, 502 and 510, and can display their location on a cartographic map on a display 554 of the second navigation device. And, in the invention, this location can further be displayed on a cartographic map on a display 544 of the first navigation device 502 and/or on a cartographic map on a display 531 connected to server 520.

One of ordinary skill in the art will understand upon reading this disclosure, the many varied systems which are covered by embodiments of the present invention. In the invention, complementary, mobile navigation devices which incorporate triangulation positioning functionality and one or more dead reckoning positioning components can be provided in a single vehicle and adapted to incorporate existing portable electronic map and handheld navigation device services with existing vehicle positioning equipment in a manner which affords more complete and reliable navigation services to a wider range of consumers. In this manner, a system is provided having complementary navigation related service such that the system can continue to provide complete and reliable navigation related services in "urban-canyons" or otherwise when a primary positioning service is interrupted. According to the teachings of the present invention, the complementary navigation devices are adapted to share tasks, resources, and information within the system between a pair of navigation devices and a remote server 520. The invention is not so limited to the examples given above. The features and functionality explained and described in detail above in connection with the devices of FIGS. 4A and 4B are likewise available in the systems of FIGS. 5A and 5B.

Figure 6:
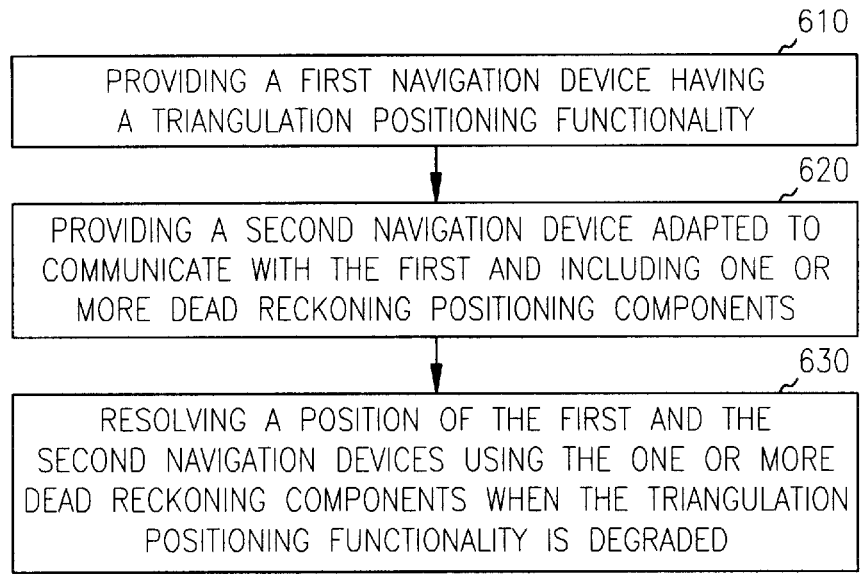
FIG. 6 is a flow diagram of one embodiment of a navigation aid method according to the teachings of the present invention.

FIG. 6 is a flow diagram of one embodiment of a navigation aid method according to the teachings of the present invention. The navigation aid method includes a method using complementary, mobile navigation devices which incorporate triangulation positioning functionality and one or more dead reckoning positioning components, e.g to provide complete and reliable navigation related services in "urban-canyons" or otherwise when a primary positioning service is interrupted. As described above, a processor, memory, transceiver, triangulation positioning component, and at least one dead reckoning component are used for processing signals which include input data from input devices, e.g. keypads, other input keys, or other inputs, GPS signals from GPS receiver, rate gyro data signals, differential wheel sensor data signals, accelerometer data signals, odometer data signals, speedometer data signals, and others of the like, and data received from I/O ports in order to perform the methods described herein. As shown in FIG. 6, the method includes providing a first navigation device having a triangulation positioning functionality in block 610. In one embodiment, providing the first navigation device including a triangulation positioning functionality in block 610 includes using a handheld GPS enabled device. In one embodiment, providing the first navigation device having a triangulation positioning functionality in block 610 includes providing a handheld multifunction device. In some embodiments, providing the handheld multifunction device includes providing a handheld multifunction device selected from the group of a Personal Digital Assistant (PDA) enabled device and a cell phone enabled device.

In block 620, the method includes providing a second navigation device adapted to communicate with the first navigation device and having one or more dead reckoning positioning components. In one embodiment, providing the second navigation device adapted to communicate with the first navigation device and having one or more dead reckoning components in block 620 includes providing a second navigation component which includes at least one sensor selected from the group of a distance determination sensor and an orientation sensor. The orientation sensor includes at least one orientation sensor selected from the group of a rate gyro and a differential turning sensor communicatively coupled to two wheels of a vehicle, and the distance determination sensor includes at least one distance determination sensor selected from the group of an accelerometer, odometer, and/or speedometer. In one embodiment according to the teachings of the present invention, providing a second navigation device adapted to communicate with the first navigation device includes providing a first and a second navigation device adapted to wirelessly communicate with one another. As one of ordinary skill in the art will understand upon reading this disclosure, the first and the second navigation devices are adapted to communicate navigation related data wirelessly using a communication technology selected from the group of infra-red signaling, cellular technology, Bluetooth technology, and microwave technology. However, the invention is not so limited.

The method further includes resolving a position of the first and the second navigation devices in block 630. In block 630, resolving the position includes using the one or more dead reckoning positioning components to determine the position when the triangulation positioning functionality is degraded.

In one embodiment, the method further includes using the first navigation device to display and to track a movement of the first and the second navigation devices. Further, in some embodiments according to the teachings of the present invention, the method further includes performing a route calculation using the first navigation device.

Figure 7:
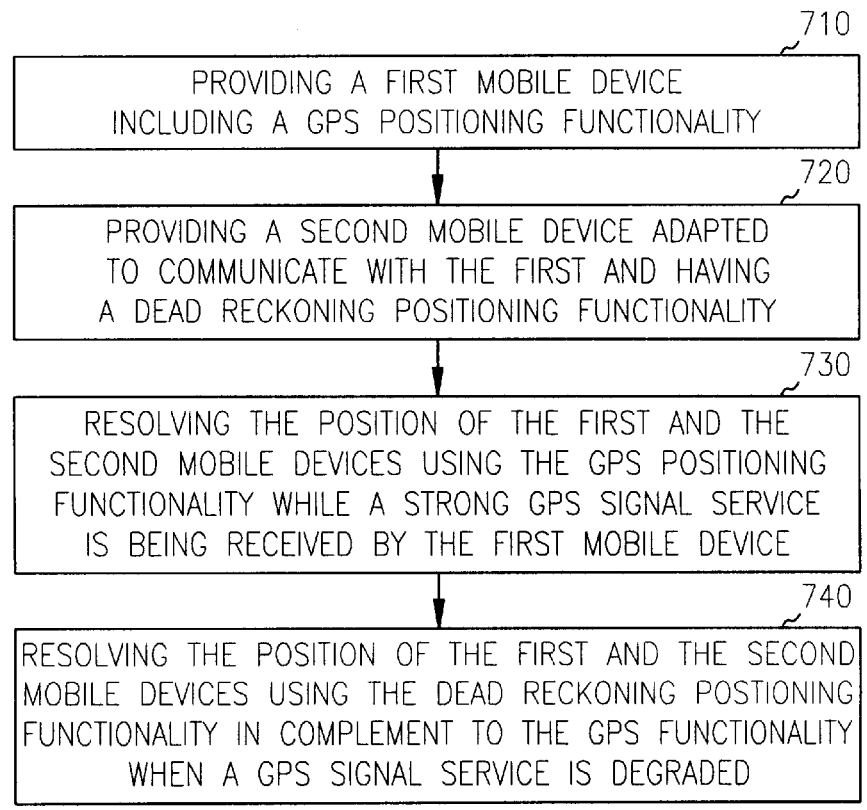
FIG. 7 is a flow diagram of another embodiment of a navigation aid method according to the teachings of the present invention.

FIG. 7 is a flow diagram of another embodiment of a navigation aid method according to the teachings of the present invention. The navigation aid method includes a method using complementary, mobile navigation devices which incorporate triangulation positioning functionality and one or more dead reckoning positioning components, e.g to provide complete and reliable navigation related services in "urban-canyons" or otherwise when a primary positioning service is interrupted. As described above, a processor, memory, transceiver, triangulation positioning component, and at least one dead reckoning component are used for processing signals which include input data from input devices, e.g. keypads, other input keys, or other inputs, GPS signals from GPS receiver, rate gyro data signals, differential wheel sensor data signals, accelerometer data signals, odometer data signals, speedometer data signals, and others of the like, and data received from I/O ports in order to perform the methods described herein. In the embodiment shown in FIG. 7, the method includes providing a first mobile device having a GPS positioning functionality in block 710. In block 720, the method includes providing a second mobile device adapted to communicate with the first mobile device. In the invention, the second mobile device includes one or more dead reckoning positioning functionality as the same has been described herein. In block 730, the method includes resolving a position of the first and the second mobile device using the GPS functionality when a strong GPS signal service is being received by the first mobile device. And, as shown in block 740, the method further includes resolving the position of the first and the second mobile device using the one or more dead reckoning components in complement to the GPS positioning functionality when a GPS signal service is degraded.

In one embodiment, the method further includes retrieving navigation related data from a memory of the second mobile device and displaying the navigation related data on the first mobile device. In the invention, the navigation related data includes navigation data selected from the group of marine craft data and automobile navigation data. In some embodiments, the method further includes retrieving navigation related data from a memory of the first mobile device. In the invention, retrieving navigation related data also includes retrieving navigation related data selected from the group of a number of waypoints, a planned route, and points of interest. As one of ordinary skill in the art will understand upon reading this disclosure, retrieving navigation related data for points of interest includes retrieving points of interest selected from the group of geographical points of interest, entertainment venues, dining venues, and lodging venues.

Figure 8:
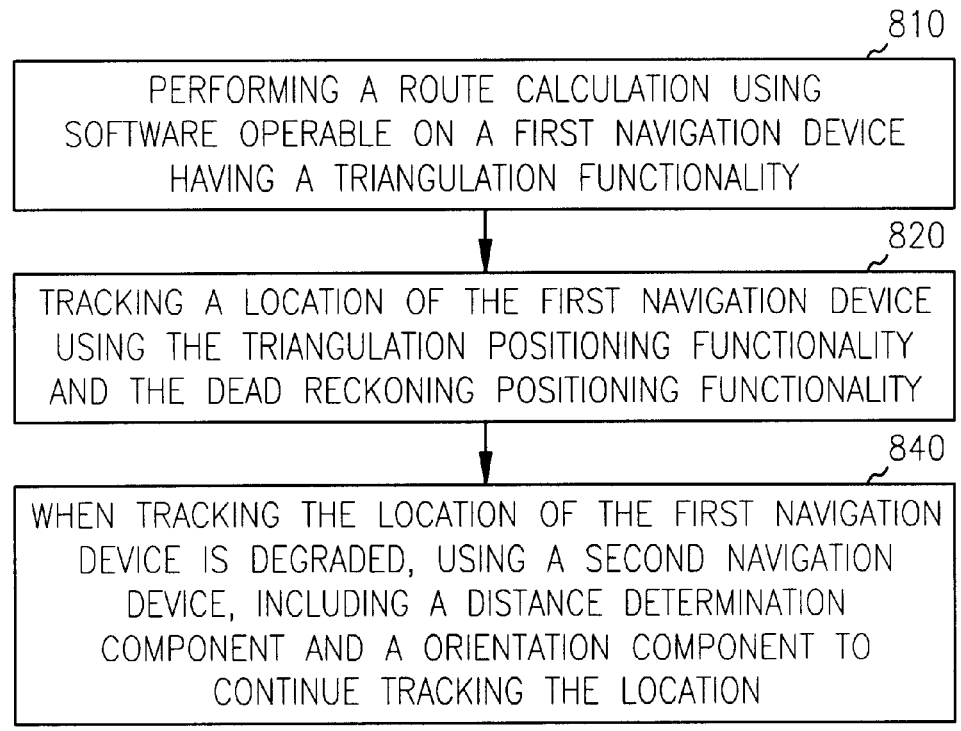
FIG. 8 is a flow diagram of another embodiment of a navigation aid method according to the teachings of the present invention.

FIG. 8 is a flow diagram of another embodiment of a navigation aid method according to the teachings of the present invention. The navigation aid method includes a method using complementary, mobile navigation devices which incorporate triangulation positioning functionality and one or more dead reckoning positioning components, e.g to complementary navigation related service such that the system can continue to provide complete and reliable navigation related services in "urban-canyons" or otherwise when a primary positioning service is interrupted. As described above, a processor, memory, transceiver, triangulation positioning component, and at least one dead reckoning component are used for processing signals which include input data from input devices, e.g. keypads, other input keys, or other inputs, GPS signals from GPS receiver, rate gyro data signals, differential wheel sensor data signals, accelerometer data signals, odometer data signals, speedometer data signals, and others of the like, and data received from I/O ports in order to perform the methods described herein. In the embodiment shown in FIG. 8, the method includes performing a route calculation using software operable on a first navigation device in block 810. In the invention, the first navigation device includes a processor and a memory in communication with one another. The memory is adapted to store navigation related data including cartographic data containing a number of locations and data indicative of thoroughfares of a plurality of types connecting certain ones of the locations. Further, in the invention, the first navigation device includes a triangulation positioning functionality and a dead reckoning positioning functionality.

In block 820, the method further includes tracking a location of the first navigation device using the triangulation positioning functionality and the dead reckoning positioning functionality. When tracking the location of the first navigation device is degraded, the method includes using a second navigation device, including a distance determination component and an orientation component, to continue tracking the location, as shown in block 830. According to the teachings of the present invention, using a second navigation device to continue tracking the location in block 830 includes using a second navigation which includes at least one orientation sensor selected from the group of a rate gyro and a differential turning sensor communicatively coupled to a wheel of a vehicle, and at least one distance determination sensor selected from the group of an accelerometer, odometer, and/or speedometer. In one embodiment of the present invention, tracking the location in block 830 includes tracking a location of the first and the second navigation device along a planned route and providing visual and audio route guidance. In the invention, the method further includes operably coupling the first and the second navigation devices to communicate with one another in a single vehicle.

As one of ordinary skill in the art will understand upon reading this disclosure, in some embodiments the method further includes software operable on the first and the second navigation devices for selecting between using the first and the second navigation devices. In this embodiment, selecting between using the first and the second navigation devices includes resolving which of the first and the second navigation devices is providing a better set of position data.

According to one embodiment of the present invention, resolving which of the first and the second navigation devices is providing a better set of position data includes; resolving whether the first navigation device is receiving triangulation positioning signals, resolving whether the second navigation device is receiving triangulation positioning data, and resolving whether either of the first and the second navigation devices are producing dead reckoning position data.

In some embodiments, the methods provided above are implemented as a computer data signal embodied in a carrier wave or propagated signal, that represents a sequence of instructions which, when executed by a processor such as processor 410 in FIG. 4A, processor 436 in FIG. 4B, or processors, 504, 514 and 524 respectively, in FIGS. 5A and 5B, cause the processor to perform the respective method. In other embodiments, methods provided above are implemented as a set of instructions contained on a computer-accessible medium, such as memory 430 in FIG. 4A, memory 442 in FIG. 4B or storage/memory, 506, 512, and 532 respectively, in FIGS. 5A and 5B, capable of directing a processor, such as processor 410 in FIG. 4A, processor 436 in FIG. 4B or processors, 504, 514 and 524 respectively, in FIGS. 5A and 5B, to perform the respective method. In varying embodiments, the medium is a magnetic medium, an electronic medium, or an optical medium.

As one of ordinary skill in the art will understand upon reading this disclosure, the electronic components of device shown in FIGS. 4A and 4B, and components of the systems shown in FIGS. 5A and 5B can be embodied as computer hardware circuitry or as a computer-readable program, or a combination of both. In another embodiment, the system 501 in° FIG. 5B is implemented in an application service provider (ASP) system.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured using C programming language or other high level language and assembly. However, as will be appreciated by one of ordinary skill in the art upon reading this disclosure, the teachings of the present invention are not limited to a particular programming language or environment.

Conclusion

The above systems, devices and methods have been described, by way of example and not by way of limitation, with respect to systems and methods with complementary, mobile navigation devices which incorporate triangulation positioning functionality and one or more dead reckoning positioning components, e.g to provide complete and reliable navigation related services in "urban-canyons" or otherwise when a primary positioning service is interrupted. Further, in some embodiments, the systems and methods integrate triangulation positioning functionality with other handheld device functionality, e.g. cell phone and/or PDA functionality, in a manner which is not cumbersome to handle or to use.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A method for navigation, comprising:
    providing a first handheld navigation device, the first navigation device including a triangulation positioning functionality and an integral display;
    providing a second navigation device to communicate with the first navigation device, the second navigation device including one or more dead reckoning positioning components;
    resolving a position of the first and the second navigation devices, wherein resolving the position includes using the one or more dead reckoning positioning components to determine the position when the triangulation positioning functionality is interrupted.

2. The method of claim 1, wherein providing the first handheld navigation device having a triangulation positioning functionality and an integral display includes providing a handheld multifunction device, and wherein providing the handheld multifunction device includes providing a handheld multifunction device selected from a group of a Personal Digital Assistant (PDA) enabled device and a cell phone enabled device.

3. The method of claim 2, wherein providing a handheld multifunction device selected from the group of a Personal Digital Assistant (PDA) enabled device and a cell phone enabled device includes providing a Personal Digital Assistant (PDA) enabled device and a cell phone enabled device having an integrated compass.

4. The method of claim 1, wherein providing the first navigation device including a triangulation positioning functionality includes using a handheld GPS enabled device.

5. The method of claim 1, wherein providing the second navigation device to communicate with the first navigation device and having one or more dead reckoning components includes providing a hand portable second navigation device which includes a rate gyro sensor.

6. The method of claim 5, wherein providing the second navigation device to communicate with the first navigation device and having one or more dead reckoning components includes providing a hand portable second navigation device which includes an accelerometer sensor.

7. The method of claim 1, wherein providing a second navigation device to communicate with the first navigation device includes providing a first and a second navigation device to wirelessly communicate with one another, and wherein the first and the second navigation devices are to communicate navigation related data wirelessly using a communication technology selected from the group of infrared signaling, cellular technology, Bluetooth technology, and microwave technology.

8. The method of claim 7, wherein the providing a first navigation device includes providing a handheld first navigation device having an integral display, and wherein the method further includes using the first navigation device to display and to track a movement of the first and the second navigation devices.

9. The method of claim 1, wherein method further includes performing a route calculation using the first navigation device.

10. A method for navigation, comprising:
    providing a first mobile device having an integral display, the first mobile device including a GPS positioning functionality;
    providing a second mobile device to communicate with the first mobile device, the second mobile device including a dead reckoning functionality, the dead reckoning functionality including an orientation component and a distance detection component;
    resolving the position of the first and the second mobile device using the GPS positioning functionality when GPS service is available; and
    resolving the position of the first and the second mobile device using the dead reckoning functionality in complement to the GPS positioning functionality when GPS service is degraded.

11. The method of claim 10, wherein the method further includes using one of the GPS positioning functionality and the dead reckoning positioning functionality to calibrate the other when a high level of confidence in accuracy is determined with one of the GPS positioning functionality and the dead reckoning positioning functionality.

12. The method of claim 10, wherein the method further includes retrieving navigation related data from a memory of the second mobile device and displaying the navigation related data on the first mobile device, wherein the navigation related data includes navigation data selected from the group of marine craft data and automobile navigation data.

13. The method of claim 12, wherein the method further includes retrieving navigation related data from a memory of the first mobile device, wherein retrieving navigation related data further includes retrieving navigation related data selected from the group of a number of waypoints, a planned route, and points of interest.

14. The method of claim 13, wherein retrieving navigation related data for points of interest includes retrieving points of interest selected from the group of geographical points of interest, entertainment venues, dining venues, and lodging venues.

15. A method for navigation in a vehicle, comprising:
    performing a route calculation using software operable on a first navigation device, the first navigation device including a processor and a memory in communication with the processor, the memory to store navigation related data, the navigation related data including cartographic data including a number of locations and data indicative of thoroughfares of a plurality of types connecting certain ones of the locations, and wherein the first navigation device includes a triangulation positioning functionality;

tracking a location of the first navigation device using the triangulation positioning functionality and the dead reckoning positioning functionality; and when tracking the location of the first navigation device is degraded, using a second navigation device, including a distance determination component and an orientation component, to continue tracking the location.

16. The method of claim 15, wherein the method further includes operably coupling the first and the second navigation devices to communicate with one another in a single vehicle.

17. The method of claim 15, wherein using a second navigation device to continue tracking the location includes using a handheld, portable second navigation device, wherein the handheld, portable second navigation device includes a cradle for the first navigation device, wherein the distance determination component includes an accelerometer sensor, and wherein the orientation component includes a rate gyro.

18. The method of claim 15, wherein using a second navigation device to continue tracking the location includes communicatively coupling the first navigation device to a dead reckoning positioning functionality in the vehicle, wherein the distance determination component includes at least one component selected from the group of an odometer and a speedometer, and wherein the orientation component includes at least one component selected from a differential wheel sensor, a rate gyro, and a compass.

19. The method of claim 15, wherein the method further includes software operable on the first and the second navigation devices for selecting between using the first and the second navigation devices.

20. The method of claim 19, wherein selecting between using the first and the second navigation devices includes resolving which of the first and the second navigation devices is providing a better set of position data.

21. The method of claim 20, wherein resolving which of the first and the second navigation devices is providing a better set of position data includes:

resolving whether the first navigation device is receiving triangulation positioning signals;

resolving whether the second navigation device is receiving triangulation positioning data; and resolving whether either of the first and the second navigation devices are producing dead reckoning position data.

22. The method of claim 21, wherein tracking the location includes tracking a location of the first and the second navigation device along a planned route and providing visual and audio route guidance.

23. A navigation system, comprising:

a first mobile navigation device including one or more dead reckoning positioning components;

a second mobile navigation device, which can be removably situated in the first mobile device, which includes a triangulation positioning functionality, and which communicates with the first mobile device, wherein the second mobile navigation device includes a processor and a memory in communication with one another, the memory to store navigation related data, the navigation related data including cartographic data including a number of locations and data indicative of thoroughfares of a plurality of types connecting certain ones of the locations, and the memory to store software including software operable to perform routing algorithms; and wherein the first and the second mobile navigation devices resolve a position of the firsthand the second navigation device using the one or more dead reckoning components of the first mobile navigation device in complement to the triangulation positioning functionality in the second mobile navigation device when the triangulation positioning functionality of the second mobile navigation device is degraded.

24. The navigation system of claim 23, wherein one or more dead reckoning components include at least one component selected from a rate gyro and an accelerometer, and wherein the triangulation positioning functionality includes a GPS receiver.

25. The navigation system of claim 23, wherein the one or more dead reckoning components includes at least one component selected from the group of an odometer, a speedometer, a differential wheel sensor communicatively coupled to two wheels of a vehicle, and a compass.

26. The navigation system of claim 23, wherein the first mobile navigation device further includes a triangulation positioning functionality, and the second navigation device further includes a dead reckoning positioning component.

27. The navigation system of claim 23, wherein the first mobile navigation device includes a processor, a memory, and a set of computer executable instructions operable thereon to perform a route calculation.

28. The navigation system of claim 23, wherein the second mobile navigation device is selected from the group of a multifunction PDA-enabled device and a multifunction cell phone-enabled device.

29. The navigation system of claim 23, wherein the second mobile navigation device, which can be removably situated in the first mobile device, and which communicates with the first mobile device, includes a second mobile navigation device which can be removably, physically interfaced to the first mobile device.

30. The navigation system of claim 23, wherein the second mobile navigation device, to communicate with the first mobile device, includes a first and a second mobile navigation device to wirelessly communicate with one another, and wherein the first and the second navigation devices communicate navigation related data wirelessly using a communication technology selected from the group of infra-red signaling, cellular technology, Bluetooth technology, and microwave technology.

31. A vehicle navigation system, comprising:

a first navigation device having a processor, a memory, and a transceiver to communicate with one another, the first navigation device including at least one positioning functionality, the memory to store navigation related data, the navigation related data including cartographic data including a number of locations and data indicative of thoroughfares of a plurality of types connecting certain ones of the locations, and the memory to store software including software operable to perform routing algorithms, a second navigation device having a processor, a memory, and a transceiver to communicate with one another, the second navigation device including at least one positioning functionality, the memory to store navigation related data, the navigation related data including cartographic data including a number of locations and data indicative of thoroughfares of a plurality of types connecting certain ones of the locations, and the memory to store software including software operable to perform routing algorithms;

wherein the transceivers in the first and the second navigation devices transmit the navigation related data wirelessly between the first and the second navigation devices; and wherein the first and the second navigation devices cooperate to resolve a position of the first and the second navigation devices.

32. The system of claim 31, wherein the at least one positioning functionality in the first navigation device includes a GPS functionality and the at least one positioning functionality in the second navigation device includes dead reckoning positioning functionality, including a distance determination sensor and an orientation sensor.

33. The system of claim 32, wherein the first and the second devices resolve the position using the GPS functionality while a strong GPS signal service is being received by the first navigation device, and wherein the first and the second devices resolve the position using the dead reckoning positioning functionality in complement to the GPS functionality when a GPS signal service is degraded.

34. The system of claim 31, wherein the first navigation device includes a display operable to display the position and a route to a desired destination, and the first navigation device to navigate the route to the desired destination using audio and visual guidance.

35. The system of claim 31, wherein the system further includes:

a remote server having a processor, a memory, and a transceiver to communicate with one another, the memory to store navigation related data, the navigation related data including cartographic data including a number of locations and data indicative of thoroughfares of a plurality of types connecting certain ones of the locations, and the memory to store software including software operable to perform routing algorithms; and the remote server to communicate with at least one of the first and the second navigation devices.

36. The system of claim 35, wherein the remote server processor responds to a request from at least one of the first and the second navigation devices by performing calculations on the cartographic data and transmitting results to the at least one of the first and the second navigation devices.

* * * * *